United States Patent
Ross, Jr.

(10) Patent No.: US 9,984,552 B2
(45) Date of Patent: May 29, 2018

(54) FIREARM DETECTING LUGGAGE

(71) Applicant: American Rebel, Inc., Nashville, TN (US)

(72) Inventor: Charles Andrew Ross, Jr., Lenexa, KS (US)

(73) Assignee: American Rebel, Inc., Nashville, TN (US)

( * ) Notice: Subject to any disclaimer, the term of this patent is extended or adjusted under 35 U.S.C. 154(b) by 0 days. days.

(21) Appl. No.: 15/428,834

(22) Filed: Feb. 9, 2017

(65) Prior Publication Data

US 2017/0236399 A1    Aug. 17, 2017

Related U.S. Application Data

(60) Provisional application No. 62/294,066, filed on Feb. 11, 2016, provisional application No. 62/318,522, filed on Apr. 5, 2016, provisional application No. 62/338,153, filed on May 18, 2016, provisional application No. 62/339,190, filed on May 20, 2016, provisional application No. 62/378,284, filed on Aug. 23, 2016, provisional application No. 62/439,274, filed on Dec. 27, 2016.

(51) Int. Cl.
*G08B 21/24* (2006.01)
*H04W 4/02* (2018.01)
*F41C 33/06* (2006.01)

(52) U.S. Cl.
CPC .............. *G08B 21/24* (2013.01); *F41C 33/06* (2013.01); *H04W 4/023* (2013.01)

(58) Field of Classification Search
CPC ............. F41C 33/06; F41C 33/00; A45C 3/00
USPC .............................. 340/568.1; 224/645, 587
See application file for complete search history.

(56) References Cited

U.S. PATENT DOCUMENTS

| | | | |
|---|---|---|---|
| 6,556,138 B1* | 4/2003 | Sliva .................... | G08B 13/126 340/545.6 |
| 6,927,696 B2* | 8/2005 | Wasson Coley ..... | G08B 21/182 340/552 |
| 2009/0174554 A1 | 7/2009 | Bergeron et al. | |
| 2009/0195400 A1* | 8/2009 | Oreshkin ............... | A41D 1/002 340/686.1 |
| 2014/0194812 A1* | 7/2014 | Amirouche ........... | A61M 5/148 604/67 |

(Continued)

FOREIGN PATENT DOCUMENTS

CA    2 929 854 A1    5/2015

OTHER PUBLICATIONS

Notification of Transmittal of the International Search Report and the Written Opinion of the International Searching Authority, or the Declaration dated Jun. 8, 2017; International Application No. PCT/US2017/017213; International Filing Date: Feb. 9, 2017; Applicant: American Rebel, Inc.

*Primary Examiner* — Steven Lim
*Assistant Examiner* — Mancil Littlejohn, Jr.
(74) *Attorney, Agent, or Firm* — Erise IP, P.A.

(57) ABSTRACT

A system and method are described for alerting a user that an area they have entered or are about to enter has a restriction on carriage of a firearm. Methods include detecting the presence of a firearm within an intelligent article of luggage, detecting the current geographic location, comparing the current geographic location to a set of restricted carriage locations, and presenting an alert.

20 Claims, 7 Drawing Sheets

(56) References Cited

U.S. PATENT DOCUMENTS

| | | | |
|---|---|---|---|
| 2015/0191150 A1* | 7/2015 | Van Wiemeersch | B60R 25/33 340/5.61 |
| 2016/0076852 A1* | 3/2016 | Liu | F41C 33/0209 224/587 |
| 2016/0358453 A1* | 12/2016 | Wassef | G08B 25/016 |

* cited by examiner

FIREARM DETECTING LUGGAGE

RELATED APPLICATIONS

This application is a non-provisional application and claims priority benefit, with regard to all common subject matter, of earlier-filed U.S. Provisional Patent Application No. 62/294,066, filed Feb. 11, 2016; 62/318,522, filed Apr. 5, 2016; 62/338,153, filed May 18, 2016; 62/339,190, filed May 20, 2016; 62/378,284, filed Aug. 23, 2016; and 62/439,274, filed Dec. 27, 2016, all entitled "PRESENCE-DETECTING CONCEALED CARRY BACKPACK." The identified earlier-filed provisional applications are hereby incorporated by reference into the present application in their entirety.

BACKGROUND

1. Field

Embodiments of the invention are broadly directed to systems and methods of alerting a user that they have or are about to carry sensitive cargo, such as a firearm, into a location with restricted carriage of such cargo. More specifically, embodiments of the invention sense the presence of a firearm within an article of luggage, compare the system's current location to a set of restricted carriage locations, and provide an alert when appropriate.

2. Related Art

Carriage of sensitive cargo, such as a firearm, into a location that restricts the carriage of such an object can have very serious consequences. Often, a firearm owner fails to realize that they are currently in possession of a firearm, perhaps because the article of luggage containing the firearm is, at times, also used to carry other non-sensitive cargo. For example, an owner may use a particular duffel bag for a business trip, forgetting that a firearm had been left inside from a previous trip to a gun range. Another common cause of violation of carriage restrictions is when an owner of a firearm is unaware that a particular location has such restrictions. For example, an owner accustomed to carrying a handgun at all times may not realize that a particular business owner bans possession of firearms within their store.

The penalty for such a mistake can vary widely from minor embarrassment to severe legal ramifications. What is needed is a system to present an alert of a current or impending violation of a restricted carriage location for an article of luggage containing sensitive cargo such as a firearm.

SUMMARY

Embodiments of the invention provide systems and methods of producing an alert related to carriage of sensitive cargo, such as a firearm. A first embodiment of the invention is directed to a method of producing an alert of a restricted carriage condition on a system including an electronic device and an article of luggage configured to contain a firearm. The method includes establishing a communication link between the device and luggage, acquiring a status of the luggage, and transmitting the status to the device. The electronic device may then present an alert if the status and a comparison of the sensed geographic location of the system to a set of restricted carriage locations indicate a restricted carriage condition. The set of restricted carriage locations may be a pre-generated list and/or custom input by a user.

A second embodiment of the invention is directed to a method of producing an alert of a restricted carriage condition on a system including an electronic device and an article of luggage configured to contain a firearm. The method includes the steps of detecting a presence of a firearm, establishing a communication link with the electronic device, transmitting a firearm presence indication via the communication link, determining a restricted carriage condition, and presenting an alert of the restricted carriage condition. The determination of the restricted carriage condition may include the steps of accessing a set of restricted carriage locations and comparing it to the geographic location of the system.

A third embodiment of the invention is directed to a system configured to produce a firearm presence indication including an article of luggage with a firearm compartment, a sensor module, a communication module, and a control unit. The system may further include a power source and/or memory unit. The sensor module is coupled to the firearm compartment to detect the presence of a firearm contained therein. The control unit is operable to transmit a firearm presence indication via the communication module.

This summary is provided to introduce a selection of concepts in a simplified form that are further described below in the detailed description. This summary is not intended to identify key features or essential features of the claimed subject matter, nor is it intended to be used to limit the scope of the claimed subject matter. Each of the above embodiments may include further hardware, components, applications, or steps not explicitly described. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 7:
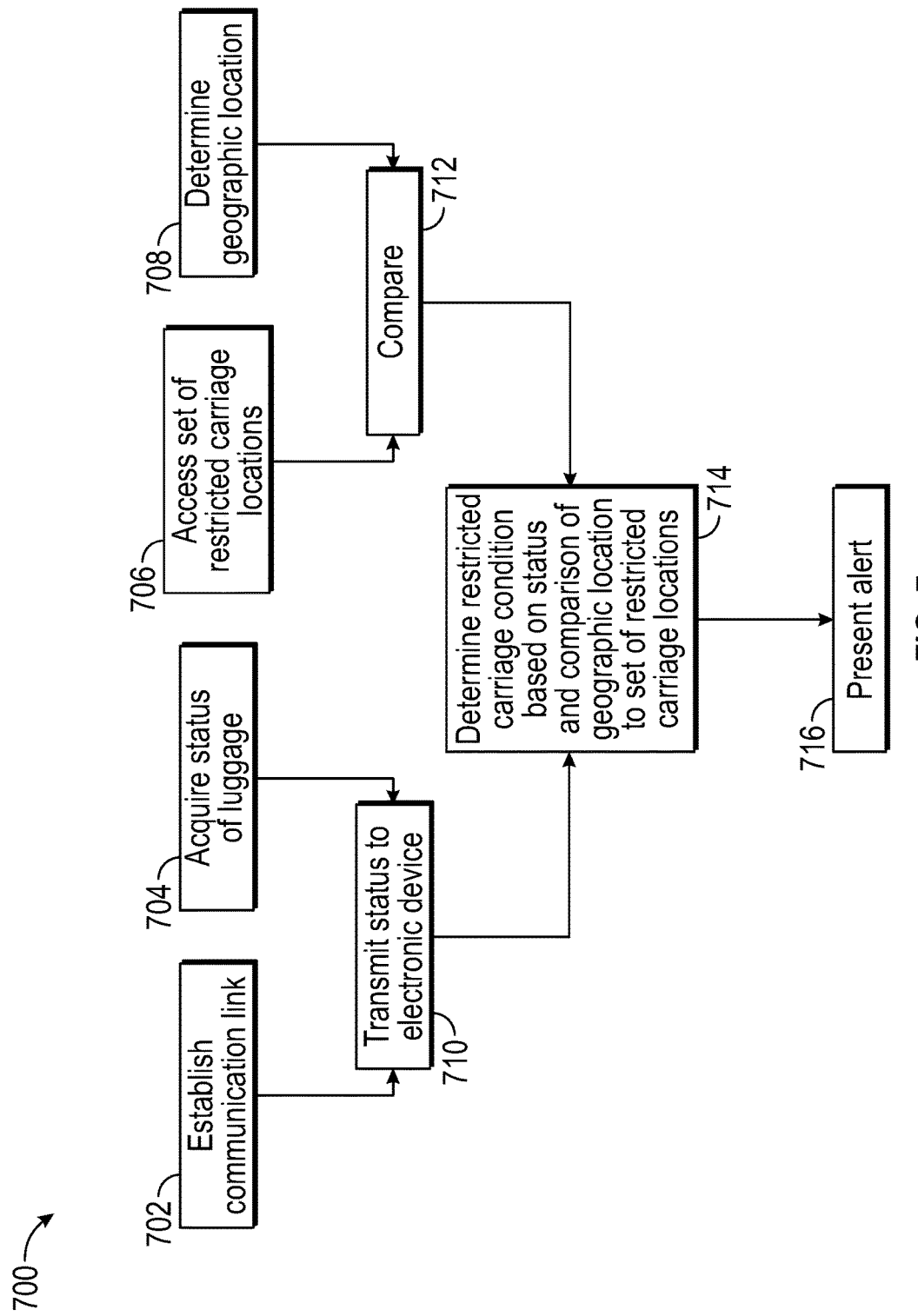
Figure 8:
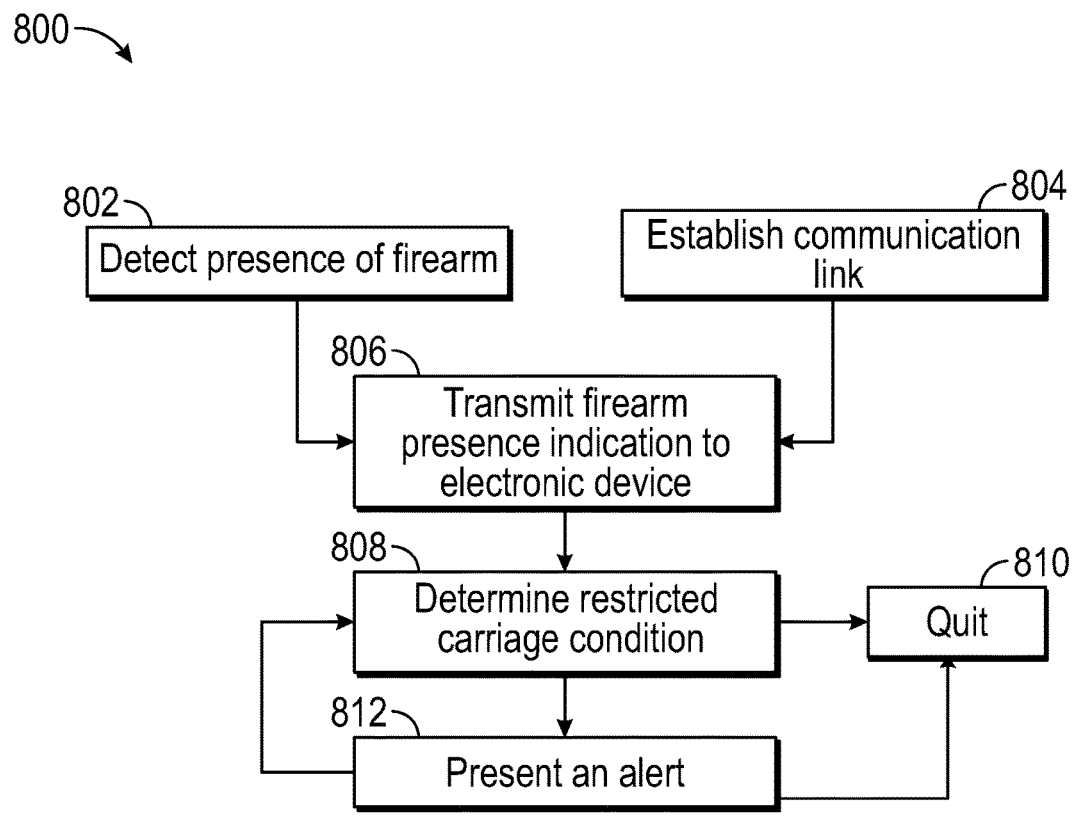

FIG. 7 is a first flow diagram of steps that may be performed in embodiments of the invention; and FIG. 8 is a second flow diagram of steps that may be performed in embodiments of the invention The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the invention provide systems and methods of producing an alert of a restricted carriage condition on a system including an electronic device and an article of luggage configured to contain a firearm. Embodiments of the invention may compare a sensed geographic location of the system to a set of locations in which carriage of a firearm is restricted. Embodiments may further detect a status of the luggage, such as a presence of the firearm or an active state of the luggage. Based on the detected status and comparison of the geographic location of the system to the set of restricted locations, an alert may be presented informing a user of a restricted carriage condition. Further embodiments may present an alert based on a removal of the firearm or a loss of a communication link between the article of luggage and the electronic device.

Figure 1:
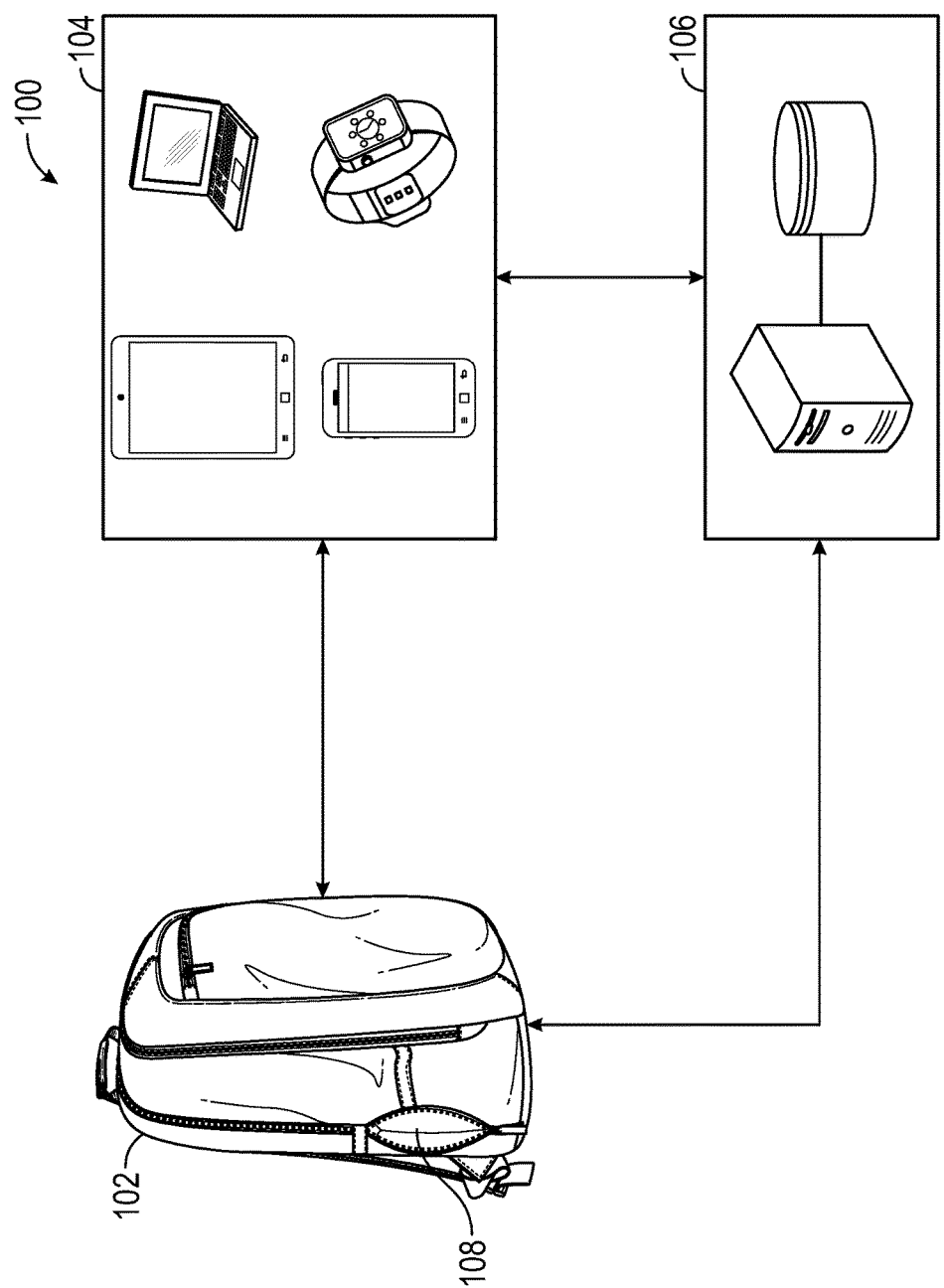
FIG. 1 is an illustration of an article of luggage in communication with one or more electronic devices and a remote database.

Turning to the figures, and particularly FIG. 1, an exemplary system 100 is illustrated, including an article of luggage 102, one or more electronic devices 104, and a remote database 106. The article of luggage 102 is illustrated as a backpack in FIG. 1, but may alternatively be formed as a briefcase, computer case, suitcase, gun range bag, purse, handbag, trunk, gun case, or any other type of portable luggage capable of containing sensitive cargo such as a firearm. In some embodiments, article of luggage 102 may alternatively be formed as a unit of apparel, such as a jacket, vest, or pair of pants. The article of luggage 102 may have one or more internal or external docking ports for carrying, connecting with, and/or charging other electronic security devices. In embodiments, the article of luggage 102 may have one or more control input mechanisms, such as a keypad or activation switch, integrated into its structure.

Regardless of form, in embodiments of the invention article of luggage 102 includes a firearm compartment 108 that is configured to contain a firearm. The firearm compartment 108 may be sized, shaped, or otherwise be provided in with physical structures that contain or secure a firearm. The firearm compartment 108 may include structures securing one or more firearms in place, such as straps, clasps, or slots. As further discussed below, the firearm compartment 108 may include one or more fasteners to close the compartment, secure a firearm, and/or indicate to the system 100 that a firearm is present.

In some embodiments, article of luggage 102 communicates with external computing devices such as an electronic device 104 or remote database 106 using any suitable number of communication networks and wired and/or wireless links (e.g., a mobile communication network, wired and/or wireless links) in conjunction with any suitable number and type of communication protocols. In embodiments, one or more of electronic devices 104 may be implemented as a handheld computing device (e.g., smartphone, tablet, laptop, a smart watch, PDA, pager, electronic fob, or a bracelet), or any other suitable type of computing device capable of wired and/or wireless communication, while one or more of remote databases 106 may be implemented as one or more cloud data services, web servers, or electronic filestores.

Figure 2B:
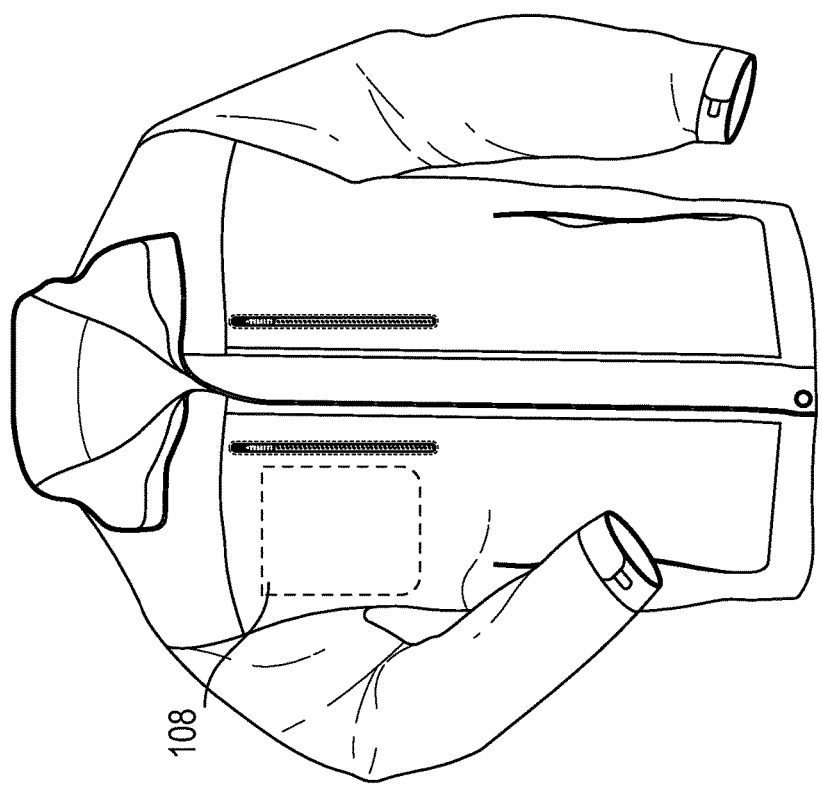
FIG. 2B depicts an article of luggage formed as a unit of apparel that may be utilized in embodiments of the invention.
Figure 2A:
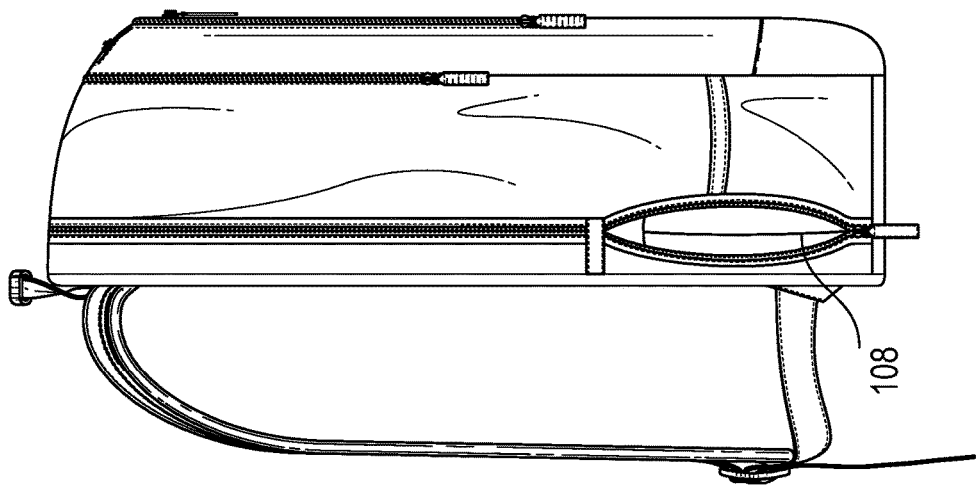
FIG. 2A depicts an article of luggage formed as a backpack that may be utilized in embodiments of the invention.

An example of a backpack that may be provided in embodiments of the invention as an article of luggage 102 is illustrated in FIG. 2A, including a firearm compartment 108 conveniently positioned for quick and comfortable access to the firearm even while the backpack is being worn. Another example of an article of luggage, provided as a unit of apparel, is illustrated as the jacket of FIG. 2B. Like the backpack of FIG. 2A, the jacket includes a firearm compartment 108 conveniently positioned for quick and comfortable access to the firearm even while the jacket is being worn. These examples are not intended to be limiting—the article of luggage may be provided as any of the examples listed above and the firearm compartment 108 may be positioned at any location on the luggage.

In embodiments, the firearm compartment 108 may be positioned such that a user may quickly and easily remove a firearm without removing the article of luggage 102. The compartment may be accessible from the right or left side, top or bottom, or any other position on the luggage. In an embodiment, the firearm compartment 108 may be positioned near the bottom of the article of luggage to keep its weight low, stabilizing the backpack.

Figure 4:
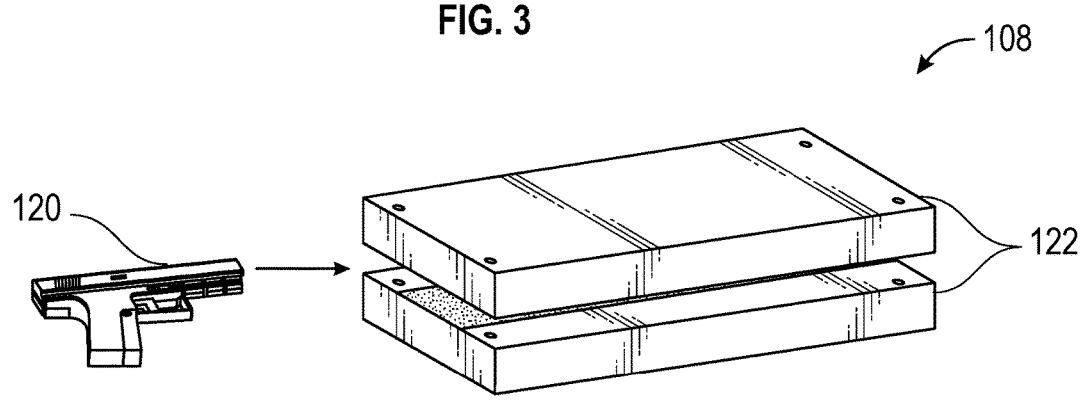
FIG. 4 illustrates a firearm being inserted between collapsible walls.

FIG. 2A illustrates a location of the compartment 108 in a backpack. The backpack includes an opening in which the compartment is removably located. The opening, and therefore the compartment, is accessible from either side of the backpack. The opening is selectively openable and closable via a zipper, magnets, buttons, or other securing mechanism. The compartment 108 is removable from the opening. As best shown in FIG. 4.

Additionally, the firearm compartment may be configured to conceal the presence of a firearm in firearm compartment 108. For example, an article of luggage formed as a coat may have a firearm compartment integrated into the inner lining of the coat, positioned under an arm. A firearm compartment may be hidden from the perspective of others by fabric, patterns, or colors.

In some embodiments, the firearm compartment 108 is a self-contained pocket, separable from the rest of the article of luggage 102. It may be held in place by a fastener such as a zipper, or may simply rest within a larger pocket. Portions of the sensor module 110 may be integrated into the removable firearm compartment, or may be disconnected upon removal of the compartment. Similarly, fasteners used to close firearm compartment 108, as discussed below, may be removed with a removable firearm compartment or left behind with the remainder of the article of luggage 102.

A communication network utilized by embodiments of the invention may include any suitable number of nodes, or additional wired and/or wireless networks. For example, a communication network may be implemented with any suitable number of base stations, landline connections, internet service provider (ISP) backbone connections, satellite links, public switched telephone network (PSTN) connections, local area networks (LANs), metropolitan area networks (MANs), wide area networks (WANs), or any suitable combination of local and/or external network connections. The communication network may be utilized in embodiments to facilitate communications between any of the article of luggage 102, electronic device(s) 104, and/or remote database(s) 106.

Figure 3:
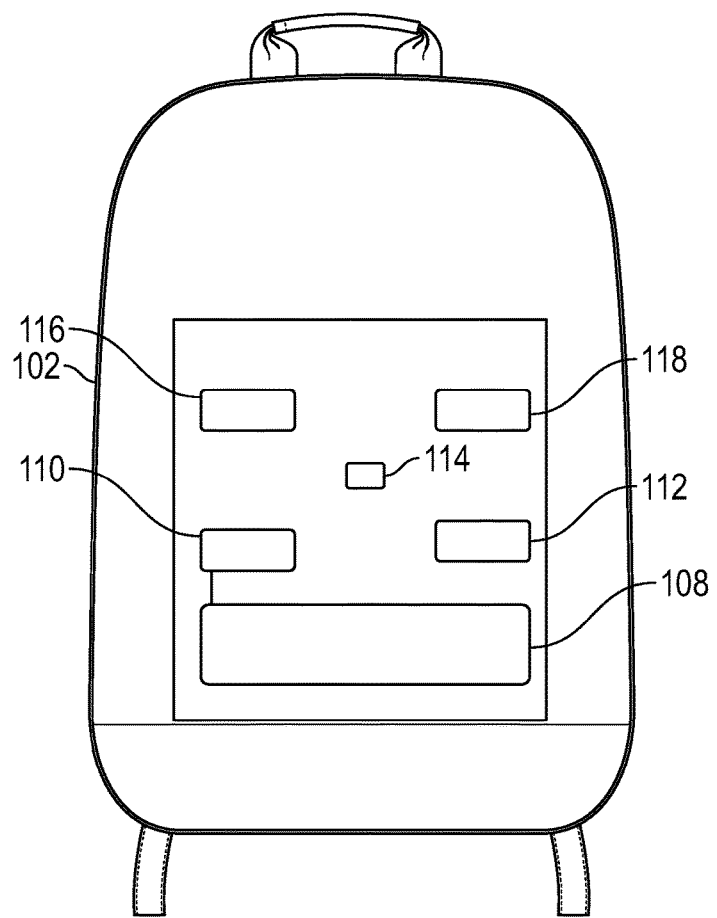
FIG. 3 is a block diagram of elements that may comprise an article of luggage in embodiments of the invention.

FIG. 3 illustrates a block diagram of elements comprising an article of luggage 102 in embodiments of the invention. The locations, shapes, sizes, and interconnections of each element as illustrated in FIG. 3 are meant only for example. In embodiments of the invention, any particular element listed may be shaped or positioned differently, or may be absent altogether.

As seen in FIG. 3, an article of luggage 102 comprises a firearm compartment 108 coupled to a sensor module 110. Sensor module 110 is operable to detect a presence of the firearm in the firearm compartment 108. A communication module 112 is operable to establish a communication link with electronic device 104, an application running on an electronic device 104, and/or a remote database 106. In embodiments, communication module may operate using a near-field communication scheme such as Bluetooth™ or RFID. Alternatively, the communication module may establish a communication link with an electronic device through use of a wireless Internet modem. These examples are not meant to be limiting; any communication protocol or scheme by which a communication link may be established between the article of luggage 102 and electronic device 104 is intended for inclusion within embodiments of the invention. Communication links between article of luggage 102 and electronic device 104 may include any sort of intermediary element, such as a satellite, router, or another portable electronic device.

FIG. 3 further illustrates a control unit 114, which may comprise any suitable type and/or number of processors, such as a host processor of article of luggage 102. To provide additional examples, a processor comprising control unit 114 may be implemented as an application specific integrated circuit (ASIC), an embedded processor, or a central processing unit (CPU) associated with article of luggage 102. Any combination of one or more processors is intended for inclusion as comprising control unit 114 in embodiments of the invention.

Processors comprising control unit 114 may be configured to operate in conjunction with one or more of sensor module 110, communication module 112, and a memory unit 118 to process and/or analyze data, to store data to memory unit 118, to retrieve data from memory unit 118, to receive, process, and/or interpret signals from sensor module 110, to generate a firearm presence indication, or to receive data from and/or send data to one or more of electronic devices 104 and/or remote database 106 via communication module 112. Processor(s) comprising control unit 114 may be configured to communicate with other components of FIG. 3 via one or more wired and/or wireless interconnections, such as any suitable number of data and/or address buses, for example. These interconnections are not shown in FIG. 3 for purposes of brevity. Article of luggage 102 may include a power source 116 such as a battery, which may be rechargeable via removal or corded connection to an electrical port. Alternatively, the article of luggage 102 may draw power from an external power source.

In accordance with various embodiments, memory unit 118 may be a computer-readable non-transitory storage device that may include any suitable combination of volatile memory (e.g., a random access memory (RAM) or non-volatile memory (e.g., battery-backed RAM, FLASH). Memory unit 118 may be configured to store instructions executable on one or more processors of control unit 114, such as those describing the various methods and techniques further discussed below, for example. These instructions may include machine-readable instructions that, when executed by control unit 114, cause control unit 114 to perform various acts as described herein. Memory unit 118 may also be configured to store any other suitable data used in conjunction with article of luggage 102, such as data received from one or more of electronic devices 104 and/or remote database 106 via communications module 112.

Memory unit 118 may include a first portion implemented as integrated, non-removable memory and a second portion implemented as a removable storage device, such as a removable memory card. For example, memory unit 118 may include a SD card that is removable from article of luggage 102 and a flash memory that is not removable from article of luggage 102.

As mentioned above, sensor module 110 is coupled to firearm compartment 108 and is operable to detect a presence of the firearm in the compartment. In embodiments, firearm compartment 108 may be shut into a closed configuration via a fastener such as one or more zippers, clasp, buttons, snaps, or magnets. Sensor module 110 may mechanically and/or electronically detect the closed configuration or an open configuration, in which the fastener(s) are not engaged. In embodiments, the sensor module 110 may detect the open or closed configuration of firearm compartment 108 via electronic coupling to the fastener(s).

Further, control unit 114 may receive an indication of the open and/or closed configurations of firearm compartment 108 from sensor module 110 to determine if a firearm is present within the compartment. In response to detecting the closed configuration, control unit 114 may transmit a firearm presence indication to an electronic device 104 via communication module 112. Additionally or alternatively, the firearm compartment 108 may be physically and/or electronically locked via any structure or mechanism that may be detected by sensor module 110. Control unit 114 may, in such an embodiment, determine the presence of a firearm when the firearm compartment 108 is secured by the locking mechanism.

In some embodiments, the method by which the firearm compartment 108 is fastened or closed may be integrated with one or more sensors that detect the presence or absence of the firearm. For example, an embodiment of the invention employs magnets sewn into either edge of the mouth of a compartment designed for carrying a firearm. Sensors situated between or around the magnets make contact while the compartment remains closed, completing a circuit. Upon opening the compartment, the circuit is broken, alerting the sensor module 110 that the firearm has likely been removed from the firearm compartment 108. A similar structure may substitute clasps or buttons in place of magnets, but otherwise function in a similar manner.

Fasteners may be controlled by the control unit 114 of the article of luggage 102 and/or electronic device 104 to act as a mobile gun safe, restricting access to the compartment and any firearms inside while locked. In embodiments, a fastener may require a security code, biometric input, keycard, or any other method of identification input to the application or control input mechanisms on the backpack to release the fastener(s) and open the compartment. A firearm compartment 108 may be locked or unlocked remotely via the application, and may depend on the sensed GPS location of the article of luggage and/or electronic device.

In another embodiment, firearm compartment 108 may comprise a plurality of walls configured to collapse inward when the compartment is empty. As illustrated in FIG. 4, a pair of walls 122 is configured to exert force inwards towards one another, into a collapsed configuration when a firearm 120 is not contained within the compartment. The force may be provided by any mechanical and/or electronic means, such as springs, fabric, actuators, or magnets. When a firearm 120 is placed into firearm compartment 108 between walls 122, the walls are forced apart from one another into an expanded configuration. In embodiments, sensor module 110 is operable to sense the expanded configuration and the collapsed configuration, allowing control unit 114 to determine the presence of a firearm 120 when the walls 122 are in the expanded configuration. This may be an alternative or addition to the fastener and securing methods above. In some embodiments, control unit 114 may determine the presence of a firearm 120 only if combinations of the described conditions that may be detected by sensor module 110 are received.

The example of FIG. 4 is not intended to be limiting. Walls 122 may be configured in any appropriate manner to enter an expanded configuration and a collapsed configuration. In some embodiments, the collapsed configuration is not completely closed, with a gap remaining between walls 122. In some embodiments, the expanded configuration may be held by mechanical or electronic structures such that the walls 122 do not compress firearm 120. Embodiments may comprise any number of walls 122 configurable into expanded and collapsed configurations.

Sensor module 110 may detect the presence of a firearm in the firearm compartment 108 in a number of alternative ways. In an embodiment, a circuit may be completed only when a firearm 120 is contained in the compartment 108 or when the compartment 108 is closed. Sensor module 110 may detect the completion of the circuit to inform control unit 114 that a firearm is present. In another embodiment, sensor module 110 may comprise structures operable to electromagnetically sense a firearm, such as a metal detector or variable capacitance capacitor. Sensor module 110 may be as sophisticated as an optical detector using visual recognition techniques and/or laser reflectometry, or may be as simple as a manual user input indicating the presence of a firearm. For example, in embodiments, a user may press a button or flip a switch comprising sensor module 110 upon placing a firearm 120 into firearm compartment 108, indicating to control module 114 that a firearm is present.

In embodiments of the invention, the control unit 114 and/or electronic device 104 may be operable to present an alert to a user when a firearm 120 is removed from firearm compartment 108, e.g., when sensor module 110 no longer detects the presence of a previously detected firearm. Additionally or alternatively, control unit 114 and/or electronic device 104 may be operable to present an alert to a user when the communication link between the communication module 112 of article of luggage 102 and electronic device 104 is lost. This may indicate to a user, for instance, that the communication module 112 is struggling to maintain the communication link, that the article of luggage 102 has been left behind or misplaced, or that the article of luggage may have been stolen. This alert may be presented immediately upon interruption of the communication link, after a period of time with a communication link, after a set number of interruptions, or after a set number of unsuccessful attempts to communicate.

Figure 5:
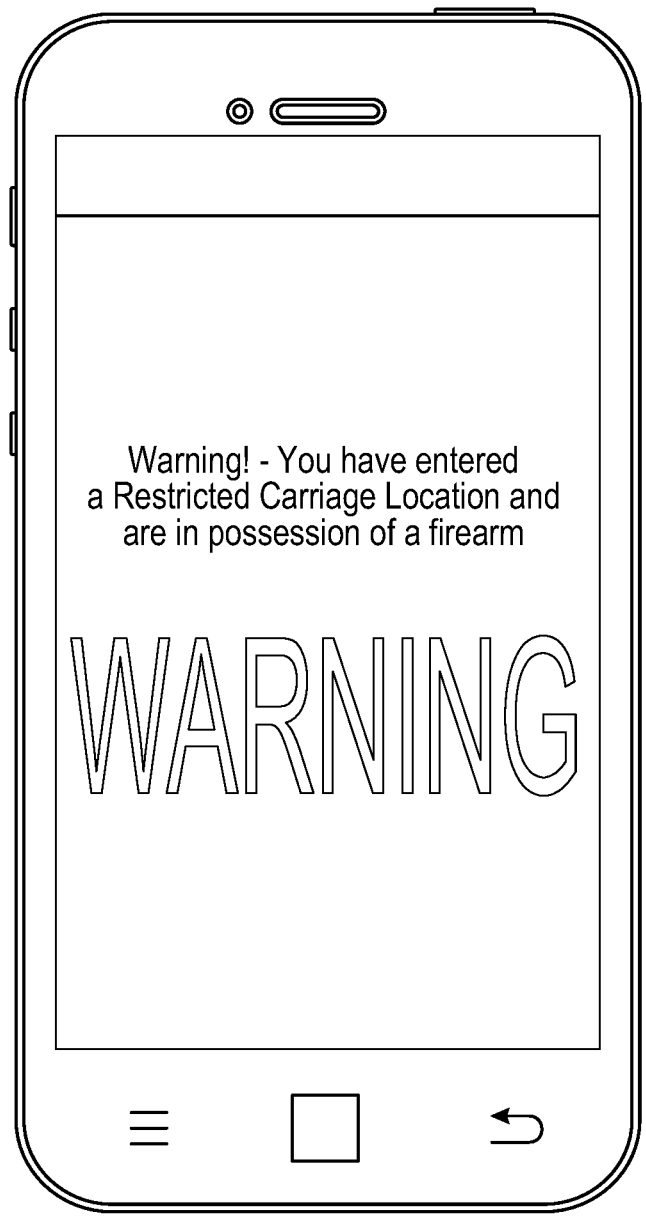
FIG. 5 illustrates an exemplary alert that may be provided in embodiments of the invention.

Additionally or alternatively, as shown in FIG. 5, an alert may be presented in embodiments of the invention when the geographic location of the system indicates that the system has entered or is about to enter a restricted carriage location. The geographic location of the system is detected, in embodiments, by a location-sensing module in article of luggage 102 and/or electronic device 104. In embodiments, a location-sensing module may use any Global Navigation Satellite System (GNSS) protocol, to determine a geographic location of the system. The module may be configured to utilize "Assisted Global Positioning System" (A-GPS), by receiving communications from a combination of base stations (that may be incorporated as part of a communication network) and/or one or more from satellites. Examples of suitable global positioning communications protocol may include Global Positioning System (GPS), the GLONASS system operated by the Russian government, the Galileo system operated by the European Union, or the BeiDou system operated by the Chinese government.

A restricted carriage location may be any area, region, building, property, municipality, address, or other space that has official or unofficial restrictions on the carriage of sensitive cargo, such as a firearm. A set of restricted carriage locations may be contained within memory unit 118 of article of luggage 102, a memory of electronic device 104, and/or stored at remote database 106 and accessible by control unit 114. A set of restricted carriage locations may be provided as GPS coordinates, addresses, buildings, regions, or any other indication of an area. In embodiments, a set of restricted carriage locations indicative of a list of known restricted carriage locations may be stored on memory unit associated with the control unit 114 of luggage 102, the device 104, and/or remote database 106 by a provider of luggage 102, an application running on electronic device 104, and/or a third party. In some embodiments, the list of restricted carriage locations may be provided, at least in part, by a local, state, or national government entity.

For instance, a set may include any or all of a bank property, an airport property, a school property, a hospital property, and a government property. Additionally or alternatively, locations in the set may indicate a government jurisdiction, such as the borders of a city, county, state, country, park, campus, or reservation. In embodiments, a set of restricted carriage locations may be retrieved once or periodically by the luggage 102 or device 104 from the remote database 106 for local access, or may be accessed from the remote database 106 upon each use of the set.

As an example, an owner may be carrying an article of luggage 102 formed as a briefcase containing a pistol in a firearm compartment 108. The article of luggage includes a communication module 112 operative to establish a communication link with the owner's cell phone. A sensor unit is able to detect the presence of the pistol based on collapsible walls having an expanded configuration. Subsequently, the control unit 114 transmits a firearm presence indication to the cell phone. In this example, the user's phone is operable to detect the geographic location of the system. In alternative embodiments, the article of luggage may perform the detection of the geographic location of the system. Upon sensing a geographic location indicating that the owner has entered or is entering a restricted carriage location such as a bank, an alert is presented to the owner on the cell phone indicating that the carried firearm entered a restricted carriage location. An example of such an alert is illustrated in FIG. 5. The cell phone may present a textual alert along with sound, colored and/or flashing lights, vibration, or any other attention-grabbing output. The user, realizing their mistake, may leave and secure the firearm in an appropriate location before returning to the bank to conduct business.

The textual alert illustrated in FIG. 5 is intended only as an example and is not meant to be limiting. In additional or alternative examples, an alert may be presented as an email, automated phone call, or SMS text message. In some embodiments, a user of the device may not be directly alerted at all, but rather an alert is presented as an entry on a data log at a remote database 106. Any or all of the above alerts may be presented to the owner of the article of luggage 102 and/or a list of additional recipients that may be custom entered.

Additionally or alternatively, locations in the set of restricted carriage locations may be provided and/or added via custom entry by an owner of the article of luggage 102 or another. For example, an owner of an article of luggage may want to be notified if they enter the home of a relative who does not want firearms in their house while carrying a firearm. The owner may add the address of the relative's house to the list of restricted carriage locations through an application running on the electronic device 104 or a web portal. This is intended only as an example and is not meant to be limiting. Custom restricted carriage locations could be input by anyone via indications other than physical address, such as by the name of the location, a set of GPS coordinates, a range from a single GPS point, or by drawing a shape on a graphical display of a map. Regardless of method of inputting the indication, the new restricted carriage location is added to the set of restricted carriage locations to be checked for restricted carriage conditions in the future.

In a further embodiment, comparison of the geographic location of the system to the set of restricted carriage locations, whether provided from a pre-generated list or custom input, may be dependent on a time and/or date. For example, a concerned parent may configure their own home as a restricted carriage location during hours and days when children are present as a reminder to remove a firearm from the article of luggage 102 and secure it in a gun safe. In another example, a police officer may wish to receive an alert of the presence of a firearm in an article of luggage only on days the officer is off-duty. The time and date dependence of restricted carriage locations may be stored at any or all of the article of luggage 102, electronic device 104, and remote database 106.

Returning to the example of the briefcase unknowingly containing a firearm being carried into a bank, the owner in such a situation may desire that an alert be presented of an eminent restricted carriage condition prior to actually entering the bank. This functionality would be of particular benefit in situations where there could be legal ramifications to entering the premises in possession of a firearm, such as in the case of an airport. In embodiments of the invention, the system may determine a restricted carriage condition and present an alert when a firearm is present and the geographic location of the system is not yet within a restricted carriage location, but rather is within a threshold proximity of a restricted carriage location.

A threshold proximity may be predefined by the provider of the article of luggage 102 or an application running on electronic device 104, or may be custom entered by a user in the same manner as the custom restricted carriage locations, discussed above. A user may select a threshold proximity distance in feet, miles, meters, or any other unit from a restricted carriage location that they wish to receive alerts.

Threshold proximities may vary by particular restricted carriage location, type of restricted carriage location (e.g. school, airport, bank, hospital), time, and/or date. Multiple threshold proximities may be active at once for any or all restricted carriage locations, with the same or varying levels and types of alert presented for crossing each. For example, a purely textual alert may be presented for coming within a mile of a government building while in possession of a firearm, while a more intense alert with vibration, sound, and flashing lights may be presented if the firearm is taken within 100 feet. In another example, the threshold proximity for a library may be set to 10 meters, while threshold proximities for airports are set at 10 meters, 50 meters, 1 kilometer, and 2 kilometers.

Figure 6:
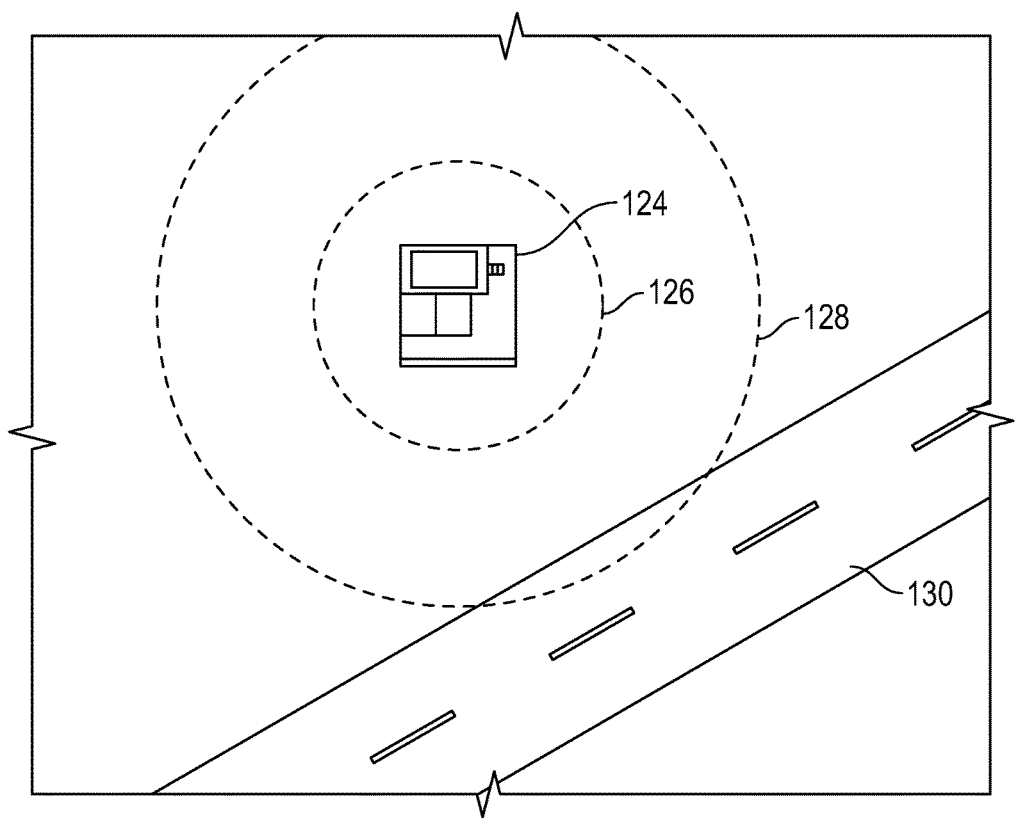
FIG. 6 is an illustration of a restricted carriage location, a nearby road, and two example surrounding threshold proximities.

A further example employing threshold proximities to present an alert of a restricted carriage condition is illustrated in FIG. 6. The location of school 124 is included in the set of restricted carriage locations to help prevent a user from accidentally entering the school carrying a backpack containing a firearm. In this example, lower threshold proximity 126 has been set to 50 feet to inform the owner of the backpack of a restricted carriage condition before he or she actually enters the school 124. Additionally, the owner has also configured the system 100 to provide another, less intense alert when the backpack is carried within a higher threshold proximity 128 of 1,000 feet for all schools in the set of restricted carriage locations. However, as seen in FIG. 6, a road 130 located near school 124 passes within the higher threshold proximity 128. Setting the higher threshold proximity to the illustrated distance would cause the system 100 to provide an alert if an owner merely drove past school 124 on road 130 with the firearm contained in an article of luggage 102. For this reason, the user in this example may choose to reduce the higher threshold proximity 128 only for school 124 to 800 feet, so that the system 100 will not provide an alert when driving on road 130. Additionally, the user may set this reduced higher threshold proximity to only be active on days and/or months during which children are likely in attendance at school 124.

While reference has been made above to the various components and techniques of embodiments of the invention, the description that follows will provide further examples systems and processes that may be added in embodiments of the invention. The description below is intended to merely exemplify steps that may be taken in practice of operation of embodiments of the invention and is not intended to be limiting. Steps that may be performed in practice of some embodiments of the invention are illustrated in FIG. 7 and herein described.

FIG. 7 illustrates the steps that may be performed in operation of an embodiment of the invention. These steps may be performed in any order, and some steps may be performed simultaneously.

The operation 700 of FIG. 7 may begin at any of steps 702, 704, 706, or 708. At step 702, communication module 112 establishes a connection between article of luggage 102 and one or more electronic devices 104. In embodiments, the establishment of the communication link may be initiated and/or governed by a processor in electronic device 104, communicating with the communication module 112. In embodiments, the communication link may be a wireless near-field communication protocol such as near-field communication scheme such as Bluetooth™. Alternative embodiments may employ a wire to establish the communication link, such as a USB cord. The communication module 112 is operable to transmit information to the electronic device 104, and may be operable to receive information from either or both of electronic device 104 and remote database 106.

At step 704, control unit 114 acquires a status of the article of luggage 102. In embodiments, this status is a presence of a firearm in firearm compartment 108, detected by sensor module 110. The sensor module may, for example, detect the closure of a fastener coupled to firearm compartment 108 or an expanded configuration of a plurality of walls 122 in firearm compartment 108. Additionally or alternatively, a status of article of luggage 102 may be an active state or powered state of the luggage. A status may indicate whether the article of luggage 102 is stationary or in motion using a location sensor, gyroscope, and/or one or more accelerometers. A status may indicate the orientation of an article of luggage, using an instrument such as inclinometer. In another embodiment, communication module 112 may transmit a status to electronic device 104 indicating that article of luggage 102 is locked and/or secured.

For this example, the status of a presence of a firearm in firearm compartment 108 is detected by sensor module 110 at step 704. At step 710, the status is transmitted to the electronic device linked in step 702 by communication module 112 under the control of control unit 114. The status may be transmitted one or more times. In embodiments, the status is transmitted as a firearm presence indication periodically until a receipt response is received from electronic device 104.

At step 706, a set of restricted carriage locations is accessed by control unit 114 and/or a processor of electronic device 104. The set of restricted carriage locations may be stored at any or all of memory unit 118 in article of luggage 102, a memory component of an electronic device 104, and/or remote database 106. In embodiments, a set of restricted carriage locations stored at memory unit 118 or the electronic device 104 may be downloaded and/or updated from remote database 106 on or more times. In embodiments, this is done at regular periodic intervals.

The set of restricted carriage locations indicate areas in which sensitive cargo, such as a firearm, should not be carried or require a certification to carry, such as a concealed carry license. The set of restricted carriage locations may be time and/or date dependent. A user or other entity may manually or automatically add locations to or remove locations from the set of restricted carriage locations, for instance to reflect changes in regulations or to add custom locations. Restricted carriage locations may be added, for example, by address, longitude and latitude, or searching a list of building names.

At step 708, the geographic location of the system 100 is determined using a location-sensing component in article of luggage 102 and/or electronic device 104. The location-sensing component may determine the system's exact location, such as using a GPS locator, may estimate the system's location, for instance based on strength of nearby communication towers. Alternatively the system 100 may use a stored last known geographic location when other location determination services are unavailable. The location may be determined at any level of specificity and any periodicity.

At step 712, the sensed geographic location determined in step 708 is compared to the set of restricted carriage locations accessed in step 706. The comparison may involve matching of GPS coordinates or boundary overlap algorithms. These are intended only as examples. Any method by which the sensed geographic location of the system may be compared to each location in the set of restricted carriage locations to determine if the system 100 has entered a restricted carriage location is intended for inclusion in embodiments of the invention.

For example, in some embodiments a restricted carriage location may be defined within any property belonging to an entity with known regulations on the carriage of sensitive cargo such as a firearm. In another embodiment, a restricted carriage condition may be determined only if there is an exact match between the sensed geographic location of the system and a location in the set of restricted carriage locations. In any embodiment, this comparison may be performed by a processor of an electronic device 104 and/or the control unit 114 of the article of luggage 102.

At step 714, a processor of an electronic device 104 and/or the control unit 114 of the article of luggage 102 determines a restricted carriage condition based at least in part on the status acquired in step 704 and the comparison of the sensed geographic location of the system to the set of restricted carriage locations performed in step 712. In one example, a restricted carriage condition if the communication module 112 transmits a firearm presence indication and the system is determined to be in a restricted carriage location. In another embodiment, a restricted carriage condition may be determined if the system 100 is within a threshold proximity of a restricted carriage location and the article of luggage 102 is turned on.

At step 716, an alert is presented of the restricted carriage condition determined in step 714. As discussed above, the alert may in the form of any or all of a textual alert, SMS text, email, vibration, sound, lights, graphics, report to a database, or automated telephone call. In some embodiments, one or more alerts may be logged and stored for review at the article of luggage 102, electronic device 104, and/or remote database 106. The alert may be presented to a pre-defined list of recipients, such as a set of telephone numbers, email addresses, or linked electronic devices.

FIG. 8 illustrates a further example of steps that may be performed in operation of one or more embodiments of the invention. These steps may be performed in any order, and some steps may be performed simultaneously. The steps of FIG. 8 may be performed in addition to or in alternative to any other steps or methods described above.

The operation 800 of FIG. 8 begins at step 802, at which the presence of a firearm is detected in an article of luggage 102. The firearm may be detected using any of the methods or structures described above, or any other appropriate means by which the presence of a sensitive cargo might be detected.

At step 804, a communication link is established between electronic device 104 and communication module 112 in article of luggage 102. The link may be maintained continuously, periodically established, or established only upon detecting the presence of a firearm in step 802 in order to conserve power. At step 806, a firearm presence indication is transmitted to electronic device 104 via the communication link. The firearm presence indication may be any electronic signal that indicates to the electronic device 104 that sensor module 110 has detected a firearm in firearm compartment 108.

At step 808, the electronic device determines a restricted carriage condition based at least in part on the received firearm presence indication from step 806. In some embodiments, the restricted carriage condition may be based solely on the firearm presence indication, without other necessary factors or considerations. In other embodiments, the electronic device may take other factors or considerations into account, such as the time, date, sensed geographic location, preferences entered into an application running on the electronic device, and/or a set of restricted carriage locations. If no restricted carriage condition is detected, the method may quit at step 810 in some embodiments. Otherwise, the method continues to step 812.

At step 812, in response to a restricted carriage condition determined in step 808, an alert is presented by system 100. In some embodiments, the alert is presented directly on the one or more electronic devices 104 to a user that is also in possession of the article of luggage 102. Additionally or alternatively, alerts may be presented to other individuals at remote locations, and/or may cause an entry to be created on remote database 106.

After presentation of an alert, the method may return to step 808, in which the restricted carriage condition is determined once again based at least in part on a firearm presence indication from the article of luggage 102. In embodiments, the method may return to step 808 only if a factor or consideration such as the time, date, sensed geographic location of the system 100, preferences entered into an application running on the electronic device, or set of restricted carriage locations has been modified or updated in some way. In an embodiment, step 812 may return to the determination of step 808 if the alert presented is not responded to in a defined manner, perhaps within a limited period of time. In other embodiments, the method may quit at step 810 after one or more presentations of the alert. The number of alerts presented before quitting may be customized by a user of the article of luggage 102 in embodiments of the invention.

In some embodiments, the control unit 114 may be configured to automatically lock and/or secure the firearm compartment 108 when a restricted carriage condition is determined in any of the described methods. Additionally or alternatively, the control unit 114 may be configured to activate an alarm system integrated into the luggage 102 to make it more conspicuous, such as by sounding a siren or activating flashing lights when a restricted carriage condition is determined. Alternatively or additionally, the control unit 114 may automatically send a text message or email, log an entry on a dedicated website of the time and location of the incident, and/or contact a call-center for which the owner of the luggage has paid a subscription to monitor the system. The call-center may then alert the owner via any method and/or contact an appropriate authority, such as a police force selected in accordance with the GPS sensed location of the system 100.

In some embodiments, the control unit 114 of the article of luggage 102 may transmit one or more test alerts to a predetermined list of recipients. The list of recipients and modes of contact thereof may be the same as those that receive alerts of a restricted carriage condition, or may be a completely separate list. These test messages may be sent periodically, e.g. monthly, to a list of recipients to check that the line of communication remains valid. The periodicity of the test message transmissions may be set by a user or provider of the luggage or an application running on an electronic device 104.

In some embodiments, the recipients of test messages are given a predetermined period, such as half an hour, to respond to the message for the line of communication to be deemed valid. If a recipient fails to respond within this predetermined period, the owner of the article of luggage 102 may be notified via email, text, or any other method to check the status of the recipients and consider updating the predetermined list. In some embodiments, the article of luggage 102 may be configured to wait until the power source 116 of the backpack is fully charged or connected to a charger to perform this test.

It should be appreciated that, while the above disclosure is directed mainly to the field of firearms, some embodiments of the invention may be applied to carriage of any sensitive cargo, such as explosives or hazardous chemicals. Embodiments of the invention may be used in any setting or field, such as shipping or military applications. Embodiments of the invention may be particularly applied to carriage of weapons other than firearms, such as bows or knives. In such embodiments, the set of restricted carriage locations accessed corresponds to the type of sensitive cargo being carried. A single embodiment may be capable of providing alerts for restricted carriage conditions for multiple types of sensitive cargo, using appropriate sensing methods and sets of restricted carriage locations for each. The firearm field discussed is merely exemplary and should not be construed as limiting.

Having thus described various embodiments of the invention, what is claimed as new and desired to be protected by Letters Patent includes the following:

1. A method of producing an alert of a restricted carriage condition on a system including an electronic device and an article of luggage configured to contain a firearm in a firearm compartment, the method comprising the steps of:
   establishing a communication link between the electronic device and the article of luggage;
   acquiring a status of the article of luggage firearm compartment,
   wherein the status of firearm compartment indicates either a collapsed configuration or an expanded configuration;
   transmitting the status of the firearm compartment to the electronic device via the communication link;
   accessing a set of restricted carriage locations;
   determining a geographic location of the system;
   comparing the geographic location of the system to the set of restricted carriage locations; and
   presenting an alert if the firearm compartment is in the expanded configuration and the comparison of the geographic location of the system to the set of restricted carriage locations indicate a restricted carriage condition.

2. The method of claim 1, further comprising the step of retrieving the set of restricted carriage locations from a remote database.

3. The method of claim 1, further comprising the steps of:
   receiving an indication of an additional restricted carriage location; and
   adding the additional restricted carriage location to the set of restricted carriage locations.

4. The method of claim 3, wherein the indication of the additional restricted carriage location is an address.

5. The method of claim 3, wherein the indication of the additional restricted carriage location is a location name.

6. The method of claim 1, wherein the comparison of the geographic location of the system to the set of restricted carriage locations indicates a restricted carriage condition if the geographic location of the system is within a threshold proximity of a location in the set of restricted carriage locations.

7. The method of claim 6, further including the step of setting the threshold proximity to a selected distance.

8. The method of claim 1, wherein at least one location in the set of restricted carriage locations indicates a government jurisdiction.

9. The method of claim 1, wherein at least one location in the set of restricted carriage locations indicates an area selected from the group consisting of a bank property, an airport property, and a hospital property.

10. The method of claim 1, wherein the step of comparing the geographic location of the system to the set of restricted carriage locations is based at least in part on a current time.

11. A method of producing an alert of a restricted carriage condition on a system including an electronic device and an article of luggage configured to contain a firearm in a firearm compartment, the method comprising the steps of:
    detecting a configuration of the firearm compartment, wherein the configuration of the firearm compartment may be an expanded configuration,
    generating a firearm presence indication when the compartment enters the expanded configuration;
    establishing a communication link between the electronic device and the article of luggage;
    transmitting the firearm presence indication to the electronic device via the communication link,
    determining a restricted carriage condition based at least in part on the firearm presence indication; and
    presenting an alert upon determination of the restricted carriage condition.

12. The method of claim 11, wherein the step of determining the restricted carriage condition further includes the steps of:
    accessing a set of restricted carriage locations;
    determining a geographic location of the system; and
    comparing the geographic location of the system to the set of restricted carriage locations.

13. The method of claim 12, wherein the restricted carriage condition is determined if the geographic location of the system is within a threshold proximity of a location in the set of restricted carriage locations.

14. The system of claim 11,
    wherein the firearm compartment includes a plurality of walls,
    wherein the expanded configuration is detected based on a loss of contact between at least two walls in the plurality of walls.

15. A system configured to produce a firearm presence indication, the system including:
    an article of luggage including a firearm compartment,
    wherein the firearm compartment is configured to contain a firearm,
    wherein the firearm compartment comprises a plurality of walls,
    wherein the walls of the firearm compartment are configured to be in an expanded configuration or a collapsed configuration,
    a sensor module coupled to the firearm compartment;
    wherein the sensor module is operable to detect the expanded configuration and the collapsed configuration,
    a communication module operable to establish a communication link with an electronic device; and
    a control unit comprising at least one processor,
    wherein the control unit is operable to perform the steps of:
    determining a presence of the firearm in the firearm compartment based on a signal from via the sensor module indicating the walls are in the expanded configuration; and
    transmitting a firearm presence indication to the electronic device via the communication module.

16. The system of claim 15, wherein the sensor module detects the collapsed configuration based on the completion of a circuit.

17. The system of claim 15, wherein the walls of the firearm compartment default to the collapsed configuration due to an inward-directed force.

18. The system of claim 17, wherein the inward-directed force is provided by at least one spring.

19. The system of claim 17, wherein the inward-directed force is provided by at least one magnet.

20. The system of claim 15, wherein the control unit is operable to perform the further steps of:
    determining a loss of the communication link between the electronic device and the communication module; and
    generating an alert of the loss of the communication link.

* * * * *